United States Patent [19]

Donnert et al.

[11] 4,276,160

[45] Jun. 30, 1981

[54] METHOD FOR WASTE WATER PURIFICATION WITH THE AID OF A SORPTION AGENT

[75] Inventors: Dietfried Donnert, Karlsruhe; Siegfried Eberle, Eggenstein-Leopoldshafen; Gerhard Endres, Rastatt, all of Fed. Rep. of Germany

[73] Assignee: Kernforschungszentrum Karlsruhe GmbH, Karlsruhe, Fed. Rep. of Germany

[21] Appl. No.: 914,905

[22] Filed: Jun. 7, 1978

[30] Foreign Application Priority Data

May 5, 1978 [DE] Fed. Rep. of Germany ....... 2726192

[51] Int. Cl.³ ............................................. B01D 15/00
[52] U.S. Cl. .................................. 210/660; 210/749; 156/605; 423/629; 423/630
[58] Field of Search ............... 423/275, 266, 625, 628, 423/630; 156/605, 606, DIG. 61; 210/24, 31 C, 32, 40, 59, 148 C; 55/24; 162/29

[56] References Cited

U.S. PATENT DOCUMENTS

| | | | |
|---|---|---|---|
| 3,839,536 | 10/1974 | Sato et al. | 423/630 X |
| 3,912,521 | 10/1975 | Cline et al. | 156/DIG. 61 |
| 3,998,732 | 12/1976 | Solbach et al. | 162/29 X |
| 4,019,952 | 4/1977 | Ploetz et al. | 162/29 |

FOREIGN PATENT DOCUMENTS 7500652  1/1975  Japan .

OTHER PUBLICATIONS

Chem. Abst., vol. 83, 1975, 15285j, Fukumori.
Chem. Abst., vol. 85, 1976, 85:9925t, Koehler.

*Primary Examiner*—S. Leon Bashore
*Assistant Examiner*—Ferris H. Lander
*Attorney, Agent, or Firm*—Spencer & Kaye

[57] ABSTRACT

A method of purifying waste water with treated aluminum oxide. The method comprises contacting the waste water with $Al_2O_3$ which has been treated with ions which when incorporated in the crystal lattice of the $Al_2O_3$ are capable of delaying crystallization of the gamma phase of the $Al_2O_3$ or with the salts of said ions.

In one embodiment, the $Al_2O_3$ is artificially synthesized and the treatment comprises incorporating the ions, which may be either anions or cations, in the course of the synthesis.

Alternatively, the $Al_2O_3$ may be treated by subjecting the $Al_2O_3$ to a surface treatment with ions capable of delaying crystallization of the gamma phase or the salts thereof.

In yet another embodiment, the $Al_2O_3$ may be doped with $CO_2$.

17 Claims, No Drawings

METHOD FOR WASTE WATER PURIFICATION WITH THE AID OF A SORPTION AGENT

BACKGROUND OF THE INVENTION

The present invention relates to a method of purifying waste waters with treated aluminum oxides.

In view of the great emphasis being placed upon waste water purification it is very important that sorbents and the like be used which are effective yet simple and economical to use.

Although activated carbon has been suggested as an adsorption agent for water purification, it has proven to be rather expensive. Furthermore, use of the carbon naturally results in a portion of its activity when thermally regenerated as well as a portion of the carbon being carried away with the purified waste water. Additionally, activated carbon adsorbs higher molecular weight substances to a lesser degree, thus making the purfication more expensive.

Pure aluminum oxide has previously been suggested as a waste water purification agent. These agents are supposed to be relatively effective in purifying water containing organic waste compounds which are strongly polar and which cannot satisfactorily be purfied with activated carbon. In particular, the $KMnO_4$ active lignin containing products of sulfite cellulose manufacturing waste waters can be adsorptively removed by means of aluminum oxide.

However, pure aluminum oxide, compared with activated carbon has a lesser purification capacity and a less broad spectrum of application. In particular, pure aluminum oxide has proven to be relatively ineffective in adsorbing neutral substances and basic compounds thus presenting a problem because waste waters contain wide varieties of substances. The term "neutral substances" refers to non-polar substances having a $p_H$ of about 7 in aqueous solution.

SUMMARY OF THE INVENTION

It is therefore an object of the present invention to provide a method of purifying waste waters containing dissolved and undissolved substances, and especially organic substances which are not easily degradable, thus avoiding the disadvantages of known processes. By undissolved substances are meant those substances and materials which are not dissolved in water but rather are suspended therein in finely divided form and cannot be removed from the water by purely mechanical means.

Another object of the invention is to provide a method of purifying waste waters containing neutral substances and basic compounds.

A further object of the invention is to provide a method of treating waste waters with materials which effectively adsorb materials which are not highly polar.

These and other objects are fulfilled according to the method of the invention which comprises purifying waste water by contacting the waste water with $Al_2O_3$ which has been treated with ions which when incorporated in the crystal lattice of the $Al_2O_3$ are capable of delaying crystallization of the gamma phase of the $Al_2O_3$ or with the salts of the ions.

According to one embodiment of the invention the $Al_2O_3$ is such that it has been artificially synthesized. In this instance the treatment comprises incorporation of ions of the type referred to above into the reagents used to synthesize the $Al_2O_3$.

The $Al_2O_3$ may be treated by incorporating either anions or cations in the reagents. When treating by incorporating cations in the reagents, the cations are added in amounts ranging from about 0.1% to 0.5% by weight based upon the weight of the treated $Al_2O_3$.

In an alternative embodiment of the invention the $Al_2O_3$ is treated by subjecting it to a surface treatment with salts comprising ions which, when incorporated into the crystal lattice of $Al_2O_3$ are capable of delaying crystallization of the gamma phase.

In yet another embodiment, the $Al_2O_3$ is treated by doping with $CO_2$ during the synthesis of the $Al_2O_3$ adding $CO_2$ into the reagents used to synthesize the $Al_2O_3$. The $CO_2$ dopant is preferably present in amounts ranging from about 0.05% to about 2.5% be weight with respect to the so treated and doped $Al_2O_3$.

DESCRIPTION OF THE PREFERRED EMBODIMENTS

According to the invention, waste waters such as the effluents from commercial processing plants are treated by contacting them with $Al_2O_3$ treated with ions which are capable of being incorporated into the crystal lattice of the $Al_2O_3$ and of delaying crystallization of the gamma phase of the $Al_2O_3$, as well as with $CO_2$. Alternatively, treatment may be performed by contacting the waste water with $Al_2O_3$ which itself has been treated with salts comprising the crystallization impeding ions referred to above.

The effluents may be purified by contacting them with the treated or doped $Al_2O_3$ by means of any of the known liquid-solid contacting techniques, as for example stirring reactors, fluidized bed reactors or fixed bed columns.

After contact, the waste water is separated from the $Al_2O_3$ leaving the sorbed and separated impurities adhering to the $Al_2O_3$. In one embodiment of the invention, the $Al_2O_3$ employed has been treated by incorporating cations of at least one of the alkali earth metals or one of the metals, iron and chromium during the synthesis of the $Al_2O_3$. The cations are present in amounts ranging from about 0.1% by weight to about 10% by weight with respect to the treated $Al_2O_3$. The cations can be present in amounts ranging from about 0.5% to about 10% by weight with respect to the treated $Al_2O_3$, but lower concentrations of about 0.1% to 0.5% can also be used with good effect.

In yet another embodiment of the invention, the $Al_2O_3$ is surface treated with anions of at least one species from the group including chloride, nitrate, sulfate and hydrogen phosphate ions, preferably an $Al_2O_3$ into whose surface anions have been introduced in the range from about 0.5% by weight to about 10% by weight with respect to the treated $Al_2O_3$ end product.

According to the invention, an $Al_2O_3$ can also be used which has been surface treated with at least one cation from the group including the alkali earth metal ions, iron ions and chromium ions. The cations introduced into the surface then are also present in the $Al_2O_3$ in quantities in the range from about 0.5% by weight to about 10% by weight.

By treating the aluminum oxide with ions or doping with $CO_2$ while it is being synthesized, the following phenomena occur:

1. The inner surface area of the $Al_2O_3$ particles is noticeably enlarged. For example, when incorporating 5 weight percent Ca++ ions in the Al₂O₃ there occurs an increase from about 80 m²/g to about 230 m²/g.

2. The Al₂O₃ crystal lattice configuration is stabilized with the result of better sorption properties, if there were no treating or doping during synthesizing the Al₂O₃, the Al₂O₃ powder would be converted at the high temperatures necessary for thermal regeneration of about 500° C. to 600° C. to a sorption mass which would be much less effective for the sorption process; and 3. In the course of the curve showing the pore size distribution there occurs a significant peak at about 20 Å; larger pores, as they can be found in undoped, pure Al₂O₃ are almost nonexistent.

Treating the surface of an undoped, that is, pure Al₂O₃ after its manufacture with suitable salts, salt solutions or oxide suspensions as in Example XXXIII, where the salts or oxides, respectively, are fixed in the surface of the Al₂O₃ particles also produces an increase in surface area and also an additional purification effect with respect to the substances to be removed from the waste water.

The method according to the invention in which the treated or doped Al₂O₃ is employed, not only avoids the drawbacks of the prior art but also permits charges containing larger quantities of the substances to be removed from the waste water. By using the treated Al₂O₃ the following can be removed with good success:

(a) Dispersion dyes such as low molecular azo dyes dispersed with surface active agents, used with cellulose esters, e.g., cellulose genuine yellow G

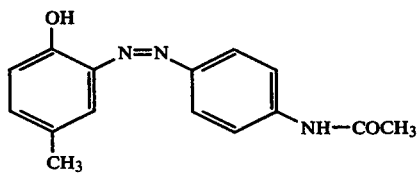

(b) Reactive dyes containing cyanuric chloride:

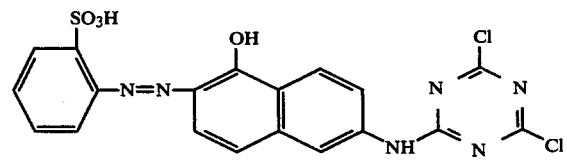

(c) Cationic dyes such as methylene blue:

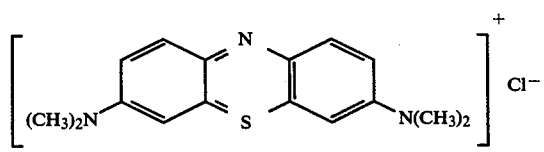

(d) Anionic dyes such as phtaleine:

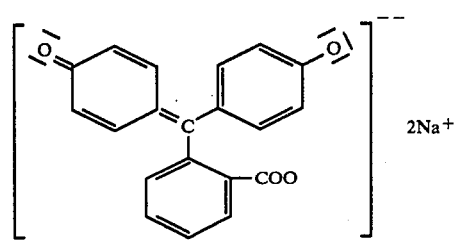

and (e) Substantive dyes containing acid and basic groups such as Congo red:

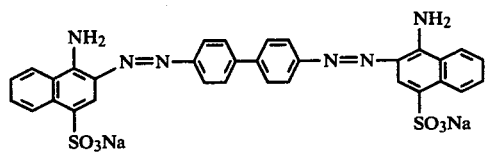

In a particularly advantageous embodiment of the invention, the Al₂O₃ is doped with carbon dioxide. Preferably, the Al₂O₃ is doped with CO₂ in amounts ranging from about 0.05% by weight to about 2.5% by weight with respect to the doped Al₂O₃.

The Al₂O₃ materials suitable for the method of the present invention can be easily manufactured and examples for the manufacture of doped Al₂O₃ by treating with ions during synthesis of the Al₂O₃ as well as for the manufacture of physicochemically surface treated Al₂O₃ and Al₂O₃ doped with CO₂ will now be set forth, respectively, for purposes of illustration and are in no way to be construed as a limitation.

EXAMPLE I

A treated Al₂O₃ is synthesized by adding 5 liters of an aqueous solution containing 1 kg aluminum nitrate to 100 g calcium nitrate and bringing the pH of the mixture to 9 with an ammonium hydroxide solution. The resulting precipitate is filtered off after having aged for two hours and is rinsed with pure water. The treated hydroxide gel is then activated at temperatures between 500° and 800° C. for a period of 10 to 24 hours. When preparing Al₂O₃ which is to comprise lower concentrations of cations in amounts of between about 0.1% and 0.5%, activation temperatures of about 500° C. to 1000° C. are used.

EXAMPLE II

Al₂O₃ is surface treated by evaporating a suspension of a commercially available aluminum oxide from a calcium nitrate solution until it is dry and the dry residue is then heat treated at 500° C. for 12 to 24 hours.

Al₂O₃ which is treated with other ion containing substances during synthesis is manufactured in an analogous manner.

EXAMPLE III

Al₂O₃ doped with CO₂ is produced by slowly bringing 5 liters of an aqueous solution containing 1 kg of aluminum nitrate to a pH of 9 with an ammonium hydroxide solution. At the same time, CO₂ is slowly introduced into the solution for 6 hours. The resulting hydroxide gel precipitate is then filtered out and rinsed with clean water. The hydroxide gel is then heat treated to activate it at a temperature of 500° C. for a period of 12 to 24 hours.

The following examples are given below for illustrating eliminating previously only incompletely or difficultly removable substances from waste waters.

EXAMPLES IV–XII 50 ml of the waste waters listed in the table below or 50 ml of a solution of the substances listed in the table below, respectively, were each mixed by shaking with 1 g of treated $Al_2O_3$ (treated by incorporating the ions during synthesis) which contained 5% by weight $Ca^{++}$ ions and their elimination effectiveness was examined. For comparison, 50 ml samples of the same waste waters and solutions were treated with $Al_2O_3$ produced in a corresponding manner but without treatment (i.e. pure $Al_2O_3$) and were likewise examined. The values obtained on the basis of analysis results for the respective elimination of the substances to be removed, in terms of the percent of the starting concentration, as well as in terms of the charge of the sorption agents in percent carbon or phosphorus, respectively (in the case of orthophosphate) or $CrO_3$, respectively (in the case of chromic acid) are compiled in the table and examples below:

| Example No. | Waste water or solution | Starting concentration of the substances to be removed [mg C/l] | $Al_2O_3$ (pure) % Elimin. | $Al_2O_3$ (pure) Charge % C | $Al_2O_3$ treated by incorporating 5 wgt. % $Ca^{++}$ % Elimin. | $Al_2O_3$ treated by incorporating 5 wgt. % $Ca^{++}$ Charge % C |
|---|---|---|---|---|---|---|
| IV. | Dyestuff fabrication waste water I | 1500 | 17 | 1.2 | 100 | 7.5 |
| V. | Dyestuff fabrication waste water II | 1000 | 40 | 2.0 | 80 | 4.0 |
| VI. | Reactive dyestuff liquor | 420 | 12 | 0.25 | 40 | 0.84 |
| VII. | Cationic dyestuff liquor | 620 | 0 | 0 | 92 | 2.8 |
| VIII. | Resorcinol solution | 654 | 0 | 0 | 80 | 2.6 |
| IX. | Methylene blue solution | 450 | 0 | 0 | 72 | 1.6 |
| X. | Malachite green solution | 1000 | 46 | 2.3 | 96 | 4.8 |
| XI. | Congo red solution | 1000 | 37 | 1.85 | 50 | 2.5 |
| XII. | o-phosphate solution | 1000 mgP/l | 28 | 1.4% P | 55 | 2.75% P |

The two waste waters I and II (examples IV and V) are genuine effluents from a factory producing mainly anthraquinone and azo-dye-stuffs. The different compounds in these effluents were not identified.

EXAMPLES XIII–XV

The procedure was the same as was described for Examples IV–XII with the exception that the treated $Al_2O_3$ (treated by incorporation during syntiesis) contained only 0.5 percent by weight $Ca^{++}$.

| Example No. | Solution containing | Starting concentration of the substances to be removed [mgC/l] | $Al_2O_3$ (pure) % Elim. | $Al_2O_3$ (pure) Charge % C | $Al_2O_3$ treated by incorporating 0.5 weight % $Ca^{++}$ % Elim. | $Al_2O_3$ treated by incorporating 0.5 weight % $Ca^{++}$ Charge % C |
|---|---|---|---|---|---|---|
| XIII | p-nitrophenol | 460 | 6.5 | 0.15 | 100 | 0.23 |
| XIV | 2,4-dinitrophenol | 1000 | 7.6 | 0.38 | 11.0 | 0.55 |
| XV | chromic acid | 1000 mgCrO_3/l | 42 | 2.1% $CrO_3$ | 86 | 4.3% $CrO_3$ |

EXAMPLE XVI

The test followed the same procedure as described for Example IV–XII with the difference that the treated $Al_2O_3$ [treated by incorporation during synthesis] contained 5 percent by weight $Ba^{++}$.

| Solution containing | Starting concentration [mgCrO_3/l] | $Al_2O_3$ (pure) % Elim. | $Al_2O_3$ (pure) Charge % $CrO_3$ | $Al_2O_3$ treated by incorporating 5 weight-% $Ba^{++}$ % Elim. | $Al_2O_3$ treated by incorporating 5 weight-% $Ba^{++}$ Charge % $CrO_3$ |
|---|---|---|---|---|---|
| Chromic acid | 1000 | 42 | 2.1 | 94 | 4.7 |

EXAMPLES XVII–XIX

The purification method was the same as described for Examples IV–XII with the exception that the treated $Al_2O_3$ (treated by incorporation during synthesis) contained 5% by weight $Fe^{+++}$.

| Example No. | Solution containing | Starting concentration of the substances to be removed [mg/l] | Al$_2$O$_3$ (pure) % Elimin. | Al$_2$O$_3$ (pure) Charge % C | Al$_2$O$_3$ treated by incorporating 5 wgt. % Fe$^{+++}$ % Elimin. | Al$_2$O$_3$ treated by incorporating 5 wgt. % Fe$^{+++}$ Charge % C |
|---|---|---|---|---|---|---|
| XVII. | Methylene blue | 450 mg C/l | 0 | 0 | 36 | 0.8 |
| XVIII. | p-nitrophenol | 460 mg C/l | 6.5 | 0.15 | 11.0 | 0.25 |
| XIX. | Chromic acid | 1000 mgCrO$_3$/l | 42 | 2.1% CrO$_3$ | 81 | 4.1% CrO$_3$ |

EXAMPLES XX–XXI

The elimination of methylene blue and p-nitrophenol was effected as described for Examples IV–XII, but with treated Al$_2$O$_3$ (treated by incorporation during synthesis) which contained 5% by weight Cr$^{+++}$ and produced the following results.

EXAMPLES XXII–XXVI

The following examples relating to the removal of sodium dihydrogen phosphate and chromic acid from aqueous solutions illustrate the advantages of the invention even when the aluminum oxide has been treated during synthesis with ions in amounts of between 0.1% to 0.3%.

| Example No. | Solution containing | Starting concentration of the substances to be removed | 0.5 g sorption agent + 100 ml solution pure Al$_2$O$_3$ % elimination | 0.5 g sorption agent + 100 ml solution pure Al$_2$O$_3$ % charge | treated Al$_2$O$_3$ (treatment with incorporation) treated with | treated Al$_2$O$_3$ (treatment with incorporation) % elim. | treated Al$_2$O$_3$ (treatment with incorporation) % charge |
|---|---|---|---|---|---|---|---|
| XXII | NaH$_2$PO$_4$ | 400 mg P/l | 25.0 | 2.0% P | 0.3 weight % Ca (heat treated at 500° C.) | 39.5 | 3.1% P |
|  |  | 200 mg P/l | 41.3 | 1.65% P |  | 68.3 | 2.7% P |
| XXIII | NaH$_2$PO$_4$ | 200 mg P/l | 3.75 | 0.15% P | 0.3 weight % Ca (heat treated at 1000° C.) | 41.9 | 0.84% P |
|  |  | 80 mg P/l | 6.5 | 0.1% P |  | 72.9 | 0.58% P |
| XXIV | NaH$_2$PO$_4$ | 200 mg P/l | 3.75 | 0.15% P | 0.2 weight % Ba (heat treated at 1000° C.) | 36.6 | 0.73% P |
|  |  | 80 mg P/l | 6.5 | 0.1% P |  | 62.3 | 0.50% P |
| XXV | NaH$_2$PO$_4$ | 200 mg P/l | 3.75 | 0.15% P | 0.1 weight % Ca (heat treated at 1000° C.) | 26.7 | 0.53% P |
|  |  | 80 mg P/l | 6.5 | 0.1% P |  | 49.0 | 0.40% P |
| XXVI | Chromic acid* | 1000 mg CrO$_3$/l | 42.0 | 2.1% CrO$_3$ | 0.3 weight % Ca (heat treated at 500° C.) | 82.9 | 3.96% CrO$_3$ |

*1 g sorption agent + 50 ml solution

| Example No. | Solution containing | Starting concentration of the substances to be removed [mgCl/l] | Al$_2$O$_3$ (pure) % Elimin. | Al$_2$O$_3$ (pure) Charge % C | Al$_2$O$_3$ treated by incorporating 5 wgt. % Cr$^{++}$ % Elimin. | Al$_2$O$_3$ treated by incorporating 5 wgt. % Cr$^{++}$ Charge % C |
|---|---|---|---|---|---|---|
| XX. | Methylene blue | 450 | 0 | 0 | 36 | 0.8 |
| XXI. | p-nitrophenol | 460 | 6.5 | 0.15 | 11.0 | 0.25 |

EXAMPLES XXVII–XXXVII

The substantially improved elimination of lignin sulfonic acid (LS) from waste waters with the aid of the process of the present invention is demonstrated by the examples shown in the table below. The procedure was the same each time as described for Examples IV–XII with the exception that instead of using an Al$_2$O$_3$ which was treated furing synthesis, Al$_2$O$_3$ was used which had been subsequently physiochemically surface treated with suitable substances.

| Example No. | Al$_2$O$_3$ surface treated with [wgt. %] | Lignin sulfonic acid elimination Starting concentration [mgLS/l] | with untreated Al$_2$O$_3$ % Elimin. | with untreated Al$_2$O$_3$ Charge % LS | Surface treated Al$_2$O$_3$ % Elimin. | Surface treated Al$_2$O$_3$ Charge % LS |
|---|---|---|---|---|---|---|
| XXVII. | 5% Ca(NO$_3$)$_2$ | 2000 | 25 | 2.5 | 60 | 6.0 |
| XXVIII. | 10% CaSO$_4$ | 1000 | 34 | 1.7 | 48 | 2.4 |
| XXIX. | 5% MgCl$_2$ | 1000 | 34 | 1.7 | 51 | 2.6 |
| XXX. | 5% ZnCl$_2$ | 1000 | 34 | 1.7 | 52 | 2.6 |

-continued

| Example No. | Al₂O₃ surface treated with [wgt. %] | Starting concentration [mgLS/l] | Lignin sulfonic acid elimination | | | |
|---|---|---|---|---|---|---|
| | | | with untreated Al₂O₃ | | Surface treated Al₂O₃ | |
| | | | % Elimin. | Charge % LS | % Elimin. | Charge % LS |
| XXXI. | 5% AlCl₃ | 1000 | 34 | 1.7 | 41 | 2.0 |
| XXXII. | 10% NiSO₄ | 1000 | 34 | 1.7 | 54 | 2.7 |
| XXXIII. | 2% GeO₂ | 1000 | 34 | 1.7 | 41 | 2.0 |
| XXXIV. | 5% NH₄Cl | 1000 | 34 | 1.7 | 79 | 4.0 |
| XXXV. | 1% NH₄NO₃ | 1000 | 34 | 1.7 | 49 | 2.5 |
| XXXVI. | 1% (NH₄)₂HPO₄ | 1000 | 34 | 1.7 | 41 | 2.0 |
| XXXVII. | 5% (NH₄)₂SO₄ | 1000 | 34 | 1.7 | 46 | 2.3 |

EXAMPLES XXXVIII–XLIII

In view of the advantages of the process according to the invention as described above, costs for waste water treatment can be reduced since fewer adsorbents are required to produce the desired degree of elimination and better quality of the discharged water is realized. The specific adsorbent consumption for the elimination of 1 g of organic carbon or LS in the waste waters or solutions, respectively, under examination is listed below.

| Example No. | Waste water or solution, resp. | Starting concentration of the substances to be removed [mgC/l] | kg Al₂O₃/kg C with | |
|---|---|---|---|---|
| | | | pure Al₂O₃ | Al₂O₃ containing 5 wgt. % Ca⁺⁺ |
| XXXVIII. | Dyestuff fabrication waste water I | 1500 | 83 | 13 |
| XXXIX. | Dyestuff fabrication waste water II | 1000 | 67 | 29 |
| XL. | Reactive dyestuff liquor | 420 | 295 | 100 |
| XLI. | Cationic dyestuff liquor | 620 | — | 100 |
| XLII. | Resorcinol solution | 654 | — | 13 |
| XLIII. | Methylene blue sol. | 450 | — | 36 |

| Example No. | Solution | Starting concentration of the substances to be removed [mgLS/l] | kgAl₂O₃/kg LS with | |
|---|---|---|---|---|
| | | | untreated Al₂O₃ | Al₂O₃ surface treated with 5 wgt. % Ca(NO₃)₂ |
| XLIV | Lignin sulfonic acid solution | 2000 | 63 | 13 |

The Al₂O₃ employed in Examples XXXVIII to XLIII was prepared by incorporation during synthesis (doping) and the waste waters I and II (Examples XXXVIII and XXXIX) are the same as in Examples IV and V.

EXAMPLES XLIV–XLV

The desirable properties of Al₂O₃ which has been doped with CO₂ are illustrated by the data below relating to the removal of sodium dihydrogen phosphate from an aqueous solution.

| Example No. | Starting concentration of the NaH₂PO₄ in the aqueous solution | 0.5 g sorption agent + 100 ml solution | | | |
|---|---|---|---|---|---|
| | | pure Al₂O₃ | | Al₂O₃ doped with 0.13 wgt. % CO₂ | |
| | | % Elim. | % Charge | % Elim. | % Charge |
| XLV | 200 mg P/l | 41.25 | 1.65% P | 50.7 | 2.03% P |
| XLVI | 80 mg P/l | 65.25 | 1.04% P | 90.3 | 1.44% P |

It will be understood that the above description of the present invention is susceptible to various modifications, changes and adaptations, and the same are intended to be comprehended within the meaning and range of equivalents of the appended claims.

What is claimed is:

1. A method of purifying waste water by contacting the waste water with a sorption agent, comprising contacting said waste water with a sorption agent which consists essentially of Al₂O₃ which has been treated with ions which when incorporated in the crystal lattice of said Al₂O₃ are capable of delaying crystallization of the gamma phase of said Al₂O₃ or with the salts of said ions.

2. The method as defined by claim 1 wherein said Al₂O₃ is artificially synthesized from reagents and said treatment comprises incorporating said ions into said reagents in the course of said synthesis.

3. The method as defined by claim 2 wherein said ions are cations and said cations are incorporated in an amount ranging from about 0.1% to about 10% by weight of said treated Al₂O₃.

4. The method as defined by claim 3 wherein said cations are incorporated in an amount ranging from about 0.5% to about 10% by weight of said treated Al₂O₃.

5. The method as defined by claim 4 wherein said ions comprise alkali earth metal cations.

6. The method as defined by claim 4 wherein said ions are iron cations.

7. The method as defined by claim 4 wherein said ions are chromium cations.

8. The method as defined by claim 1 wherein said Al₂O₃ is treated by subjecting said Al₂O₃ to a surface treatment with at least one of said salts.

9. The method as defined by claim 1 wherein said Al₂O₃ is treated by subjecting said Al₂O₃ to a surface treatment with at least one of said ions.

10. The method as defined by claim 1 wherein said ions comprise anions selected from the group consisting of chlorides, nitrates, sulfates, hydrogen phosphates, and mixtures thereof.

11. The method as defined by claim 10 wherein said surface treatment comprises introducing said anions to the surface of said $Al_2O_3$ in an amount ranging from about 0.5% to about 10% by weight based upon the weight of the treated $Al_2O_3$.

12. The method as defined by claim 1 wherein said $Al_2O_3$ is treated by subjecting said $Al_2O_3$ to a surface treatment with cations in an amount between about 0.5% to 10% by weight of said treated $Al_2O_3$.

13. The method as defined by claim 12 wherein said cations comprise iron cations.

14. The method as defined by claim 12 wherein said cations comprise alkali earth metal cations.

15. The method as defined by claim 12 wherein said cations comprise chromium cations.

16. A method of purifying waste water by contacting the waste water with a sorption agent, comprising contacting said waste water with a sorption agent which consists essentially of $Al_2O_3$ which has been doped with $CO_2$.

17. The method as defined by claim 16 wherein said $CO_2$ is doped into said $Al_2O_3$ in amounts ranging from about 0.05% to about 2.5% by weight with respect to said doped $Al_2O_3$.

* * * * *

UNITED STATES PATENT AND TRADEMARK OFFICE
CERTIFICATE OF CORRECTION

PATENT NO. : 4,276,160
DATED : June 30th, 1981
INVENTOR(S) : Dietfried Donnert et al It is certified that error appears in the above—identified patent and that said Letters Patent is hereby corrected as shown below:

In the heading of the patent, in [30] Foreign Application Priority Data, change "May 5, 1978 [DE] Fed. Rep. of Germany..2726192" to read as follows:
--June 10, 1977 [DE] Fed. Rep. of Germany....2726192
May 5, 1978 [DE] Fed. Rep. of Germany......2819572
May 5, 1978 [DE] Fed. Rep. of Germany......2819573 --.

Signed and Sealed this

Nineteenth Day of June 1984

[SEAL]

Attest:

*Attesting Officer*

GERALD J. MOSSINGHOFF

*Commissioner of Patents and Trademarks*